(12) United States Patent
Winkler

(10) Patent No.: US 7,051,016 B2
(45) Date of Patent: May 23, 2006

(54) METHOD FOR THE ADMINISTRATION OF A DATA BASE

(75) Inventor: Kay Hans-Peter Winkler, Darmstadt (DE)

(73) Assignee: Software AG, Darmstadt (DE)

( * ) Notice: Subject to any disclaimer, the term of this patent is extended or adjusted under 35 U.S.C. 154(b) by 523 days.

(21) Appl. No.: 10/192,067

(22) Filed: Jul. 10, 2002

(65) Prior Publication Data

US 2003/0033315 A1    Feb. 13, 2003

(30) Foreign Application Priority Data

Jul. 10, 2001  (EP) .................................. 01116843

(51) Int. Cl.
*G06F 17/30* (2006.01)

(52) U.S. Cl. ..................... 707/3; 707/100; 707/102; 715/513

(58) Field of Classification Search ............... 707/2, 707/3, 5, 100, 102; 715/500, 513
See application file for complete search history.

(56) References Cited

U.S. PATENT DOCUMENTS

| 5,553,216 | A  |   | 9/1996 | Yoshioka et al. ........... 715/515 |
|-----------|----|---|--------|-------------------------------------|
| 5,708,806 | A  |   | 1/1998 | DeRose et al. ........... 707/104.1 |
| 6,105,022 | A  |   | 8/2000 | Takahashi et al. ............. 707/3 |
| 6,240,407 | B1 |   | 5/2001 | Chang et al. ................. 707/2 |
| 6,415,285 | B1 | * | 7/2002 | Kitajima et al. ............... 707/5 |
| 2001/0011271 | A1 | * | 8/2001 | Takahashi et al. ............. 707/3 |

FOREIGN PATENT DOCUMENTS

| EP | 1 089 195 | 4/2001 |
| WO | WO 97/34240 | 9/1997 |

* cited by examiner

*Primary Examiner*—Tony Mahmoudi
*Assistant Examiner*—Hassan Mahmoudi
(74) *Attorney, Agent, or Firm*—Meyertons Hood Kivlin Kowert & Goetzel, PC; Jeffrey C. Hood

(57) ABSTRACT

The invention relates to a method for administrating a data base comprising a document set, a schema and a repository. The data base comprises a structure index, into which a document reference and, assigned to said document reference, at least one structure path reference of the referenced document is mappable as supplementary path reference. Further at least one schema path reference is mappable into the structure index as missing path reference. The invention relates to a data base. The data base is installed for administration by the inventive administration method. The invention relates to a computer system with a storage unit and a central processing unit. The storage unit of the computer system includes a data base, which is administrated according to the invention by means of the central processing unit.

30 Claims, 6 Drawing Sheets

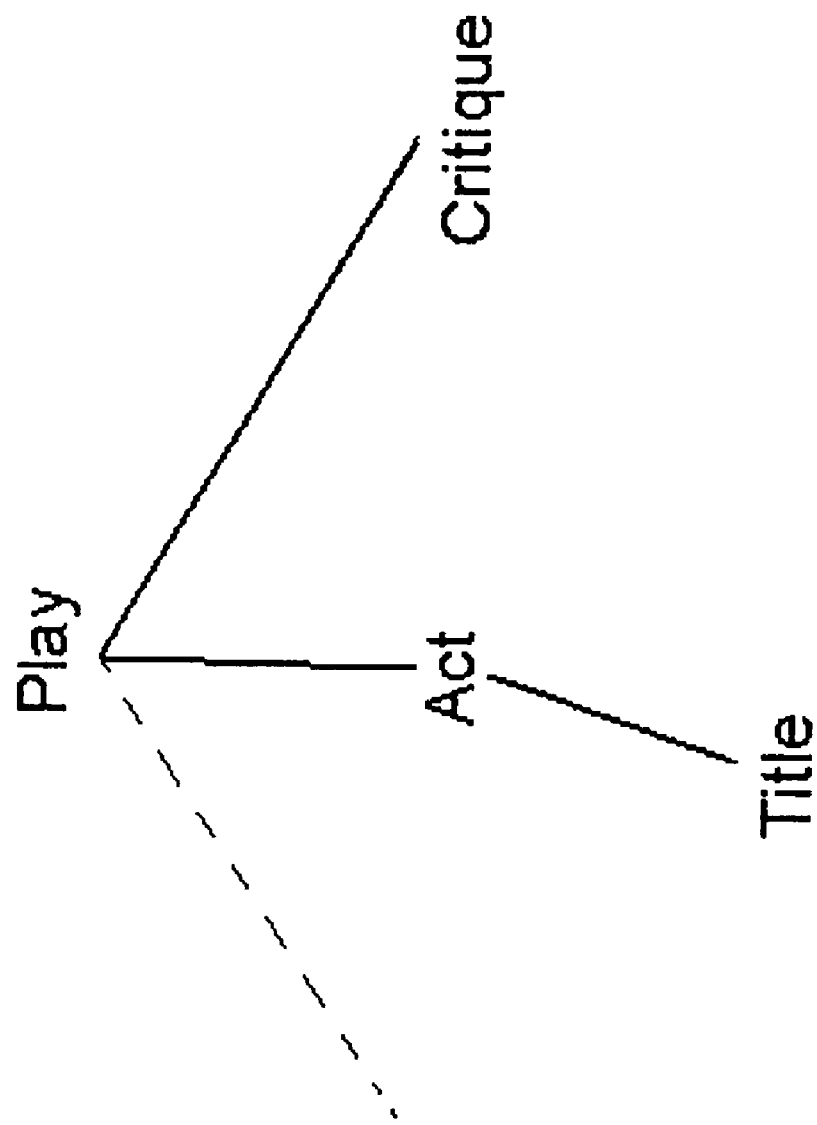

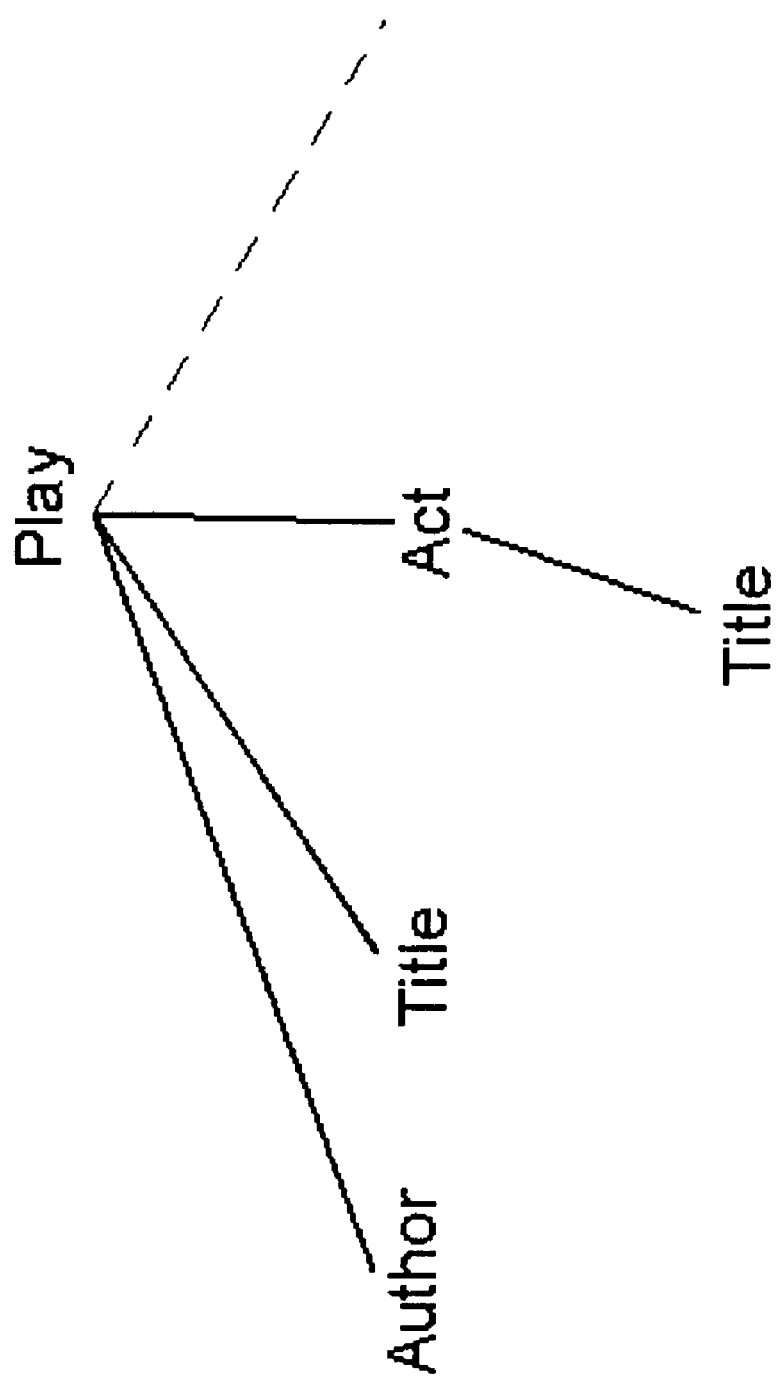

| Path Reference | Selectivity |
|---|---|
| # 0 | 1 |
| # 1 | 0,5 |
| # 2 | 1 |
| # 3 | 0,5 |
| # 4 | 1 |
| # 5 | 0,5 |

Fig. 5b

| Path Reference | Document Reference |
|---|---|
| # 0 | # 27, # 28 |
| # 1 | # 28 |
| # 2 | # 27, # 28 |
| # 3 | # 27 |
| # 4 | # 27, # 28 |

Fig. 5a

| Document Reference | Missing Path Reference | Additional Path Reference. |
|---|---|---|
| #27 | #1 | |
| #28 | #3 | #5 |

Fig. 6

METHOD FOR THE ADMINISTRATION OF A DATA BASE

BACKGROUND OF THE INVENTION (1) Field of the Invention

The invention generally relates to database administration. The invention relates to a method for the administration of a data base, comprising a document set for reception of at least one referenceable, structured document, which comprises at least one data element, the position of which in the document structure is determined by a referenceable structure path, a schema which comprises a first node, to which further nodes are dependently linkable, so that, from the first node, to each further node of the schema respectively leads a referenceable schema path, and a repository, into which the schema path and, assigned to said schema path, at least one document reference is mappable. The generic method comprises the following steps:

Searching the repository, to check if the structure path reference of the document corresponds to a schema path reference of the schema, and—if so mapping the documents referenced in the repository of the data base while assigning the document reference to the schema path reference.

The invention further relates to a method for determining a data base schema, which comprises a first node, to which further nodes are dependently linkable, so that, from the first node, to each further node of the schema respectively leads a referenceable schema path, by means of a set of one or more structured documents.

The invention also relates to a method for mapping a data base schema, which comprises a first node, to which further nodes are dependently linkable, so that, from the first node, to each further node of the schema respectively leads a referenceable schema path, into a repository of the data base, into which the schema path and, assigned to said schema path, at least one document reference is mappable.

Further the invention relates to a data base with a document set for reception of at least one referenceable, structured document, which comprises at least one data element, the position of which in the document structure is determined by means of a referenceable structure path, a schema which comprises a first node, to which further nodes are dependently linkable, so that, from the first node, to each further node of the schema respectively leads a referenceable schema path, and a repository, in which the schema path and, assigned to said schema path, at least one document reference is mappable.

Furthermore the invention relates to a storage means for a storage unit for a computer.

Moreover the invention relates to a computer system, with at least one central processor unit, at least one central processing unit, at least one storage unit being connected with the central processing unit, said storage unit having a storage means for storing data and all commands for the central processing unit, at least one input means, for inputting data and/or commands into the central processing unit and/or for inputting data into the storage unit and at least one output means, for outputting data from the central processing unit and/or the storage unit.

(2) Description of Related Art

One method for the administration of a data base is known from EP 1 089 195 A1. In the data base, data, especially content data and structure data is stored. The data is part of a document, which comprises several data elements and are stored in the data base. Each data element contains content data and/or structure data.

The data base is structured by means of a schema. The schema is defined in a predetermined manner. It describes the data to be expected for the data base. The description does not have to be complete. In the schema several nodes are assigned to each other hierarchically. One single so-called root node provides the highest level of the schema. All other nodes of the hierarchy depend on said root node. A full designation of each node corresponds to a "schema path" from the root node to the designated node. Thus, each fully designated node comprises an information about what is the relationship of the node to other nodes in the hierarchical structure. The data base comprises a repository, into which for every node the respective path from the root node to the node and a path reference which points to said path are mappable.

The known data base is provided for reception of documents, the structure of which is predetermined in a section of the respective document, in which one or more tags are defined. The definition of every tag includes a classification of the respective tag with regard to the totality of the tags of the document so that the structure of the document is determined. The structure of the document is hierarchically formed. A first position in the structure being described by a first tag is thus sub-, co- or superordinate to a second position in the structure being described by a second tag. From the highest level of the hierarchy a path leads to each position in the structure.

The content of the document is contained in one or more data elements. The data elements of the document are arranged structurally, by each data element being marked by one tag respectively, said tag describing the content of the respective data element.

Together each data element and the respective tag of the data element form a pair. Each pair is referenceable by a path reference, which points to the path and thus to the position of this pair in the hierarchical structure. The path reference can be mapped into the repository together with the referenced path to the pair of data element and tag of the data element.

Each document is referenceable by a document reference. The document reference can be mapped into the repository. The repository is formed as central administrative unit of the data base.

The repository is created, namely initialized, when the first document is stored in the data base. The repository gets updated, namely extended, when a further document is stored. Creating respectively updating of the data base is carried out in such a way, that the document which is stored runs through an analysis routine, which arranges the data of the document in pairs of one data element and one tag. Due to the defined position of the tag in the hierarchical structure of the document, each pair is assigned to a respective node in the schema of the data base. If the schema does not yet comprise the node, a path to the node and an assigned path reference are mapped into the repository of the data base. At any rate the document reference of the document is assigned to the path reference of the node and the document reference is mapped into the repository of the data base.

Since the repository comprises the path reference of each pair, it reflects the schema of the data base, i.e. the hierarchical structure of the data base. During the existence of the data base, the path references are so to speak stored in the repository.

In practice, a data base which is administrated on a computer system with a storage unit and a central processing unit can be very large. The data base then comprises such an extensive repository, that searching said repository will require a considerable processing time of the central processing unit of the computer system.

In U.S. Pat. No. 6,240,407 B1 a method is described to create a repository of a data base by means of a structured document. The structured document is analyzed whether it comprises at least one data element. Then the document is abstracted by using pre-determinable abstraction steps to obtain a set of abstracted values. The set of abstracted values is stored in the repository.

The set of abstracted values is smaller compared to the set of data elements, so that the size of the repository is comparatively smaller. A data base, the repository of which is set up with the known method, enables a fully structured search for data elements, said data elements comprising a content which is predetermined by means of a search word and said data elements being marked by means of a tag said tag being predetermined by means of a filter, but the search as regards contents within an abstracted value however requires a larger processing time consumption, because it extends respectively to the quantity of data elements which are registered by the abstraction of the data elements to the abstracted value.

One disadvantage of the known method is, that the size of the repository strongly increases if documents are stored in the data base, which are not fully described by the schema of the data base. Such documents are called "open-content" document. The structure of the "open-content" documents conforms to the schema of the data base in which they shall be stored, but it differs from the schema of the data base in such a way, that it represents an enlargement compared to the schema of the data base. The respective document can then comprise at least one tag to which no node of the schema of the data base corresponds. When the document is stored in the data base the schema has to be supplemented by the respective node and a mapping of the additional node into the repository is necessary. If for this reason, during the administration of the data base, the schema comprises more and more nodes, many applications for technical reasons may not be able to conduct a search because of the required processing time, resulting in the computer system used to administrate the data base to deny service.

BRIEF SUMMARY OF THE INVENTION

A first object of the invention is to improve the known method for the administration of data in a data base into which documents are mappable, the structure of which may differ from the schema of the data base in such a way, that the processing time consumption for accessing the data in the data base is particularly low.

A second object of the invention is to provide a method by means of which a data base schema is detectable for a data base, so that the data base can be searched by providing particularly speedy access.

A third object of the invention is to provide a method for mapping a data base schema so that the data base can be searched by providing particularly speedy access.

A fourth object of the invention is to create a data base which is searchable with a particularly low processing time consumption.

A fifth object of the invention is to create a storage means, which provides a particularly high speed access to stored data.

A sixth object of the invention is to provide a computer system which enables a particularly high speed access to data stored by means of the computer system.

The invention solves the first object by a first method for administrating a data base comprising a document set for reception of at least one referenceable structured document, which comprises at least one data element the position of which in the document structure is determined by a referenceable structure path, a schema comprising a first node, to which further nodes are dependently linkable, so that, from the first node, to each further node of the schema respectively leads a referenceable schema path, a repository into which the schema path and, assigned to said schema path, at least one document reference is mappable and a structure index into which the document reference and, assigned to said document reference, at least one structure path reference is mappable; wherein the first method comprises the steps of:

Searching the repository to check if the structure path reference of the document corresponds to a schema path reference of the schema, and—if so mapping the document reference into the repository of the data base while assigning the document reference to the schema path reference;

and—if not mapping the document reference into the structure index of the data base, if the document reference is not yet mapped into the structure index, mapping the structure path reference as a supplementary path reference which is assigned to the document reference into the structure index of the data base in case the supplementary path reference is not yet mapped, while assigned to the document reference, into the structure index under assignment to the document reference.

The term "document" is a generalization of the term "record" regarding structured and repeated elements. A document can be acquired by a data file and fill out said data file. Alternatively, the document may be part of a data file, which acquires several documents. Alternatively, the document may fill out several data files. The document comprises at least one "data element". As known in the art the data element may be provided as a data field of the record for reception of content data. According to the invention the document is provided structurally. The structured document comprises at least one data element, which contains structure data with the position of the data element in the structure of the document. The structure is provided hierarchically, especially arborescent. "Storing" stands for mapping the document in the data base, for example by import or entry, so that the data base contains the document.

For searching the data base, the user specifies a "filter", i.e. the user restricts the searched content as designated by a search word, by a tag regarding the positions of the data element in the hierarchical structure of the document comprising the searched content. A search function detects in the repository of the data base the path reference of the paths to that node, to which the restricting tag corresponds. The search function checks each document, the document reference of which is mapped, while assigned to the detected node with respect to whether a section of the content of the data element being marked by the tag of the filter corresponds to the search word. If so, this data element is added to the search result.

The processing time consumption for searching a data base into which documents are mappable, whose structure may differ from the schema of the data base is particularly low, if the document is mapped into the data base by using the first method according to the invention. Thus, the method according to the invention provides a particularly speedy access to data in the data base.

The method according to the invention especially enables a particularly high speed search, also if the hierarchical structure of the stored documents does not respectively correspond strictly to the schema of the data base. The hierarchical structure of the respective document can differ from the schema in such a way that it comprises at least one data element whose tag is not assignable to any node of the schema. Such a tag lies on a "supplementary path".

If the filter specified by the user comprises a tag on a supplementary path, the search in the data base requires a particularly small expenditure of processing time, because the structure index for each document contains a "supplementary path reference", unless the referenced path in the schema of the data base does not lead to a node. A search for the supplementary path references of the document therefore spares a time-consuming searching of a data element which is superordinated in the hierarchical structure of the document because of a designation by a superordinate tag, which lies on the route of the supplementary path and to which there exists a corresponding node in the schema of the data base.

Further the invention solves the first object by a second method for administrating a data base, comprising a document set for reception of at least one referenceable, structured document, which comprises at least one data element, the position of which in the document structure is determined by a referenceable structure path, a schema which comprises a first node, to which further nodes are dependently linkable, so that, from the first node, to each further node of the schema respectively leads a referenceable schema path, a repository into which the schema path and, assigned to said schema path, at least one document reference is mappable and a structure index into which the document reference and, assigned to said document reference, at least one structure path reference is mappable; the second method comprising the steps:

Searching the repository to check, if the structure path reference of the document corresponds to a schema path reference of the schema, and—if so mapping the document reference into the repository of the data base while assigning the document reference to the schema path reference;

searching the document to check if the schema path reference corresponds to one of the structure path references assigned to the document;

and—if not mapping the document reference into the structure index of the data base, unless the document reference is not yet mapped into the structure index; and mapping the schema path reference as a missing path reference, being assigned to the document reference into the structure index of the data base, unless the missing path reference is not yet mapped, while assigned to the document reference, into the structure index.

The processing time consumption for searching a data base into which documents are mappable, the structure of which may differ from the schema of the data base is particularly small, in case the document is mapped by using the second method according to the invention.

The method according to the invention namely provides a particularly quick search, if the hierarchical structure of the stored documents does not respectively correspond strictly to the predetermined schema of the data base. The hierarchical structure of the respective document can differ from the schema in that, with regard to at least one node of the schema, it does not comprise a data element marked by a tag corresponding to the node. Such a node respectively tag lies on a "missing path".

If the filter comprises a tag on a missing path, the search in the structure index requires a particularly small expenditure of processing time, because the structure index for every document contains a "missing path reference", if the reference path in the hierarchical structure of the document does not lead to a data element. Searching of the missing path reference of the document therefore spares a time consuming searching of the repository for the path reference of existing tags of data elements of the document.

Therefore, the above mentioned methods according to the invention provide, especially when combined, a particularly quick searching of a data base in which documents are stored, the structure of which differs from the schema of the data base. The methods according to the invention extend the scope of application of data bases to mapping of numerous documents comprising "open" content, whose structure can be heterogeneous. One effect of technical limitations, especially regarding the command processing speed of a central processing unit of a computer system for the administration of the data base according to the invention and for the performance of the methods according to the invention is minimized, because the size of the indices to be searched is minimized.

Preferably the method comprises the following steps:
Checking if in the structure index of the data base for a document, which was deleted from the data base, an entry of the document reference exists, and—if so
checking if at least one entry of a missing path reference exists which corresponds to the document reference, and—if so
deleting the at least one identified missing path reference from the structure index of the data base;

and further:
checking if at least one entry of a supplementary path reference exists which corresponds to the document reference and—if so
deleting the at least one identified supplementary path reference from the structure index of the data base;

and further:
deleting the detected document reference from the structure index of the data base.

By means of the preferred method the structure index of the data base can be kept particularly "lean", so that a search requires a particularly small processing time expenditure. The data can be found in a particularly efficient way. The total search duration until accessing data of the resulting set in the data base is particularly short. In this embodiment the method removes such path references from the structure index, which are assigned to a document being deleted from the data base. "Deleting" means removal of the document from the data base, so that access to the data elements of the deleted document by means of the search function (also: access function, retrieval function or the like) of the data base is not provided.

The method in this embodiment provides a referential integrity of the data base. "Referential integrity" means, that the repository, related to the structure index of the data base, fully and precisely reflects the structure of the documents stored in the data base. The referential integrity results from the fact, that in this embodiment of the invention the method administrates the structure index of the data base in such a way, that it so to speak keeps an account of the documents and their respective structure. The referential integrity of the data base enables a predominantly structural search which is not burdened by path references, which were assigned to documents, which, meanwhile have been deleted from the data base. Thus, the access time for data in the data base is optimized.

In one embodiment of the method according to the invention the structure index is provided like a list. It comprises a document list for receiving the document reference of each mapped document. In a further embodiment, the structure index comprises at least one supplementary path list for reception of the structure path references as supplementary path references, which are assigned to the mapped documents. In yet another embodiment the repository comprises at least one missing path list for reception of the schema path references as missing path references, which are assigned to the mapped documents. The advantage of organizing the structure index in lists is, that in the arrangement according to the invention the structure index comprising the mapped references is storeable particularly compact on a storage medium, so that particularly short access times for the references are possible. Thus, a data base search can be performed particularly quickly with the above-mentioned embodiments of the method according to the invention.

In an embodiment of the method according to the invention the structured document is formatted in a mark-up language. Each position in the structure, i.e. every data element is marked by a tag of the markup language. A data element to which no further data elements are subordinated, can be filled with content. The markup language is provided preferably as "extended markup language" (XML).

The invention solves the second object by a method for the determination of a data base schema, which comprises a first node to which further nodes are dependently linkable, so that, from the first node, to each further node of the schema respectively leads a referenceable schema path, by means of a set of one or a plurality of structured documents, comprising for each data element of each document of the set the steps of:

Tree-walking the path in the structure of the document from the first node of the schema in the direction of a node which corresponds to the position of the first data element;

inserting of that node into the schema, which prior to reaching the data element, is sequential to the last node present in the schema;

repeating the preceding steps until the data element is reached.

The invention solves the third object by a method for mapping a data base schema, which comprises a first node to which further nodes are dependently linkable, so that, from the first node, to each further node of the schema respectively leads a referenceable schema path, in a repository of the data base, into which the schema path as well as, assigned to said schema path, at least one document reference is mappable, with the steps for each node:

Mapping the schema path into the repository; and mapping the schema path reference into the repository while assigning of the schema path reference to the schema path.

According to a preferred embodiment of the above-mentioned method the data base comprises a document counter for mapping the number of documents which are stored in the data base. Each time a document of the set is mapped respectively detected, the document counter counts up one predetermined unit. "Detected for the first time" means, that a document was stored in the data base before, but has not yet been detected by the document counter. This may be the case for example, if a data base according to the state of the art is converted respectively installed with the aim, that the administration method according to the invention will be applied to this data base. To this end, both a repository and a structure index have to be installed. If a document is deleted from the data base, the document counter counts down one predetermined unit. Thus, the document counter contains information about the number of documents in the data base which were detected at the set up of the schema.

Particularly preferred is one embodiment where one node counter is assigned to each node of the schema. The node counter is stepped up by the predetermined unit, if the first respectively any further document of the set is mapped respectively determined and if this document comprises a data element at a position in the hierarchical structure of the document corresponding to the node. The node counter is stepped down if a document is deleted from the data base, the document comprising a data element at a position in the hierarchical structure of the document wherein the position corresponds to the node. By means of the values of the counters the selectivity of the node can be detected for each node of the schema. "Selectivity" stands for the ratio of the number of data elements stored in the data base which are arranged at a position of the hierarchical structure of the respective document, which corresponds to the position of the node in the schema and to the number of stored documents. The possibility to obtain knowledge about the selectivity, is particularly advantageous, because it may serve the data base provider as a basis for a formation of the predetermined schema as a—according to objective criteria and/or the subjective criteria of the data base provider—utmost "ideal" schema, by means of which a search of the data base requires particularly little time of the central processing unit.

The invention solves the fourth object by a first data base, comprising a document set for reception of at least one referenceable, structured document, which comprises at least one data element, the position of which in the document structure is determined by a referenceable structure path, a schema, which comprises a first node, to which further nodes are dependently linkable, so that, from the first node, to each further node of the schema respectively leads a referenceable schema path, a repository into which the schema path and, assigned to said schema path, at least one document reference is mappable, and a structure index, in which the document reference and, assigned to said document reference, at least one structure path reference as supplementary path reference is mappable.

The invention solves the fourth object further by a second data base comprising a document set for reception of at least one referenceable structured document which comprises at least one data element, the position of which in the document structure is determined by a referenceable structure path, a schema which comprises a first node to which further nodes are dependently linkable, so that, from the first node, to each further node of the schema respectively leads a referenceable schema path and a repository into which the schema path and, assigned to said schema path, at least one document reference is mappable and a structure index, into which the document reference and, assigned to said document reference, at least one structure path reference is mappable as missing path reference.

One preferred embodiment of the data base according to the invention which comprises the features of both the first and the second above-mentioned data base. In the data bases according to the invention the structure index is provided document-oriented. "Document-oriented" means, that information for example path references are mapped into the structure index in such a way, that they are assigned respectively to one document. The above-mentioned embodiment of the data base is particularly advantageous, because the inventive methods are applicable for the administration of the data base. A retrieval of data from the data base which is administrated by the method according to the invention requires a particularly low processing time expenditure.

Especially preferred is an embodiment of the data base, in which the data base comprises a selectivity index. In the selectivity index, for each node of the schema, the ratio of the value of the assigned node counter to the value of the document counter can be entered. In this embodiment of the data base according to the invention the selectivity index is provided schema oriented. "Schema orientated" means, that information e. g. document references are entered in the selectivity index in such a way, that they are assigned respectively to one node of the schema. The selectivity index enables a particularly quick access to the selectivity information. Thus, one condition is provided for adapting the predetermined schema continuously to the—according to the objective criteria and/or the subjective criteria of the data base provider—utmost "ideal" schema. An adaptation of said schema may for example be required due to an entry or a deletion of a document, because the selectivity of a node has changed in such a way, that its introduction into the schema is reasonable.

The invention solves the fifth object by a storage means for a storage unit for a computer, which comprises the data base according to the invention. The storage means includes a storage medium or another means for retaining data. In one embodiment the storage means is provided controllably deletably. Data retained by this storage means can be made inaccessible at least to an ordinary reading means, for an ordinary user to read the retained data, for example by destroying the data.

The invention solves the sixth object by a first computer system comprising at least one central processing unit, at least one storage unit with a storage means for storing data and/or commands for the central processing unit, the storage means being connected to the central processing unit, at least one input means for inputting data and/or commands into the central processing unit and/or for inputting data into the storage unit, at least one output means, for outputting data of the central processing unit and/or the storage unit, wherein the storage means comprises the data base according to the invention. The invention solves the sixth object further by a second computer system comprising at least one central processing unit, at least one storage unit with a storage means for storing data and/or commands for the central processing unit, the storage unit being connected to the central processing unit, at least one input means, for inputting data and/or commands into the central processing unit and/or for inputting data in the storage unit, at least one output means for outputting data of the central processing unit and/or the storage unit, wherein the central processing unit is provided for carrying out process steps of the method according to the invention. Preferred is an embodiment of the computer system comprising the features of both the first and the second above mentioned computer system. This inventive computer system enables an inventive administration of a data base in such a way that the processing time expenditure for searching the data base is particularly low.

BRIEF DESCRIPTION OF THE SEVERAL VIEWS OF THE DRAWINGS

Subsequently an exemplary embodiment of the invention is described with reference to the drawings:

FIG. 3 is a structure of an instance of a first document, which is stored in the data base of FIG. 1;

FIG. 4 is a structure of an instance of a second document, which is provided for storing in the data base of FIG. 1;

FIG. 5a is a repository of the data base of FIG. 1;

FIG. 5b is a selectivity index of the data base of FIG. 1; and

FIG. 6 is a structure index of the data base of FIG. 1.

According to the exemplary embodiment the data base is provided for the purpose of storing texts of theater plays in the data base. The data base is installed with the expectation, that respectively one document comprises a text of a play including a critique. The exemplary embodiment merely serves as an example: Neither with regard to the embodiment nor with regard to the application purpose the inventive methods, the inventive data base, the inventive storage means and the inventive computer system are limited to said exemplary embodiment! In particular the invention includes all kinds of structured data. Thus, according to another embodiment of the invention, not being elaborated upon below, the data base is provided to store XML documents comprising process sequences in the data base.

DETAILED DESCRIPTION OF THE INVENTION

Figure 1:
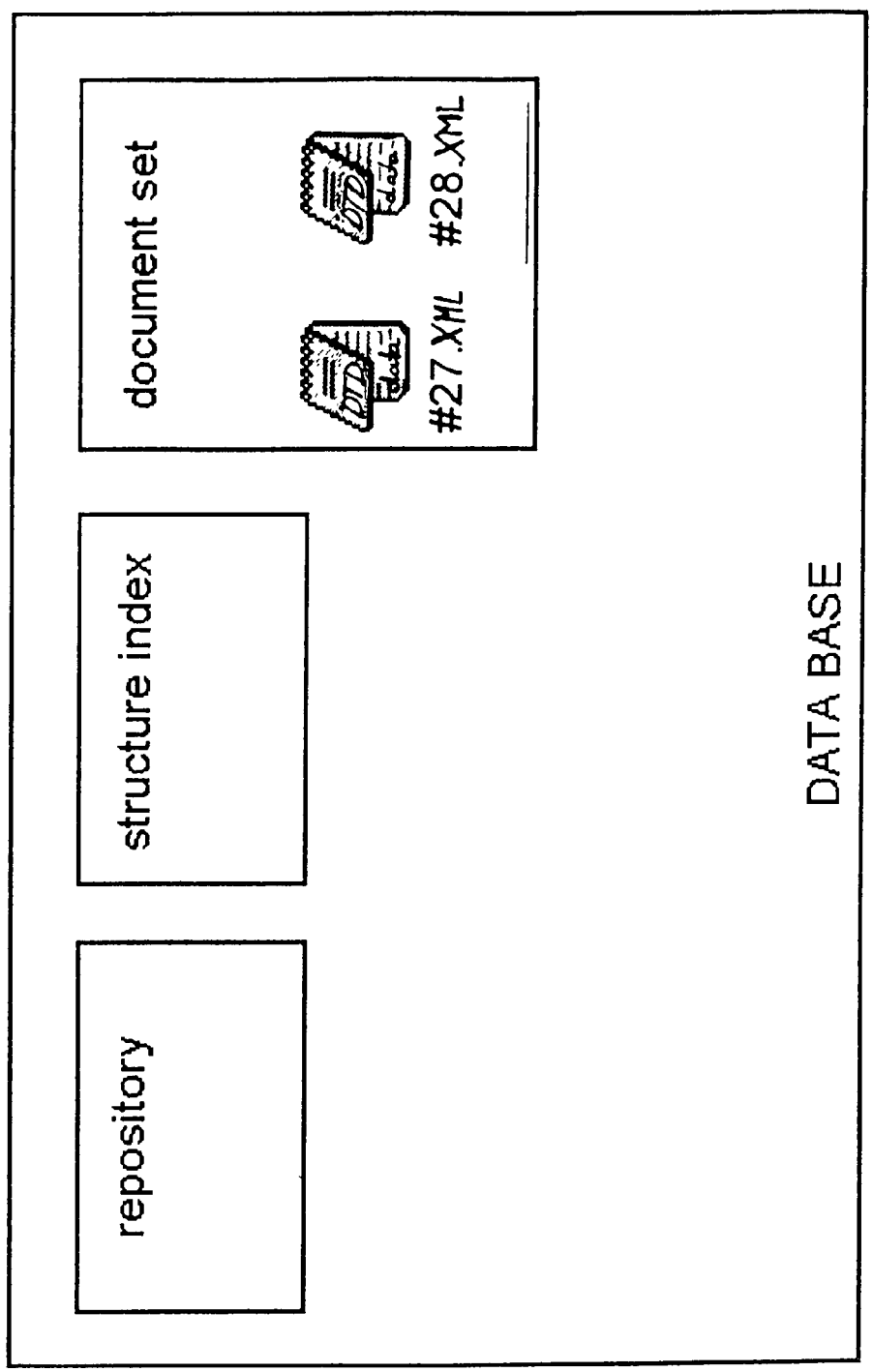
FIG. 1 is an organization of a data base which is administrated by means of the inventive method.

The data base according to the exemplary embodiment is illustrated in FIG. 1. It comprises a document set, a repository as central administration unit of the data base and a structure index. In the document set two documents are situated which are referenced by means of a document reference, i.e. a characteristic number. Here the characteristic number of the first document is # 27, the number of the second document is # 28. The documents are formatted in the so-called "extended markup language" (XML), i.e. they are provided as XML-documents. The documents respectively comprise a prologue which includes a document type-definition (DTD), as well as an instance, which includes the XML-data. The document type definition prescribes, what the document of a certain type has to look like. The correspondingly marked-up document itself is the instance of the document type. Accordingly in one embodiment the XML-document can comprise but the instance, while the document type-declaration is separately stored.

Figure 2:
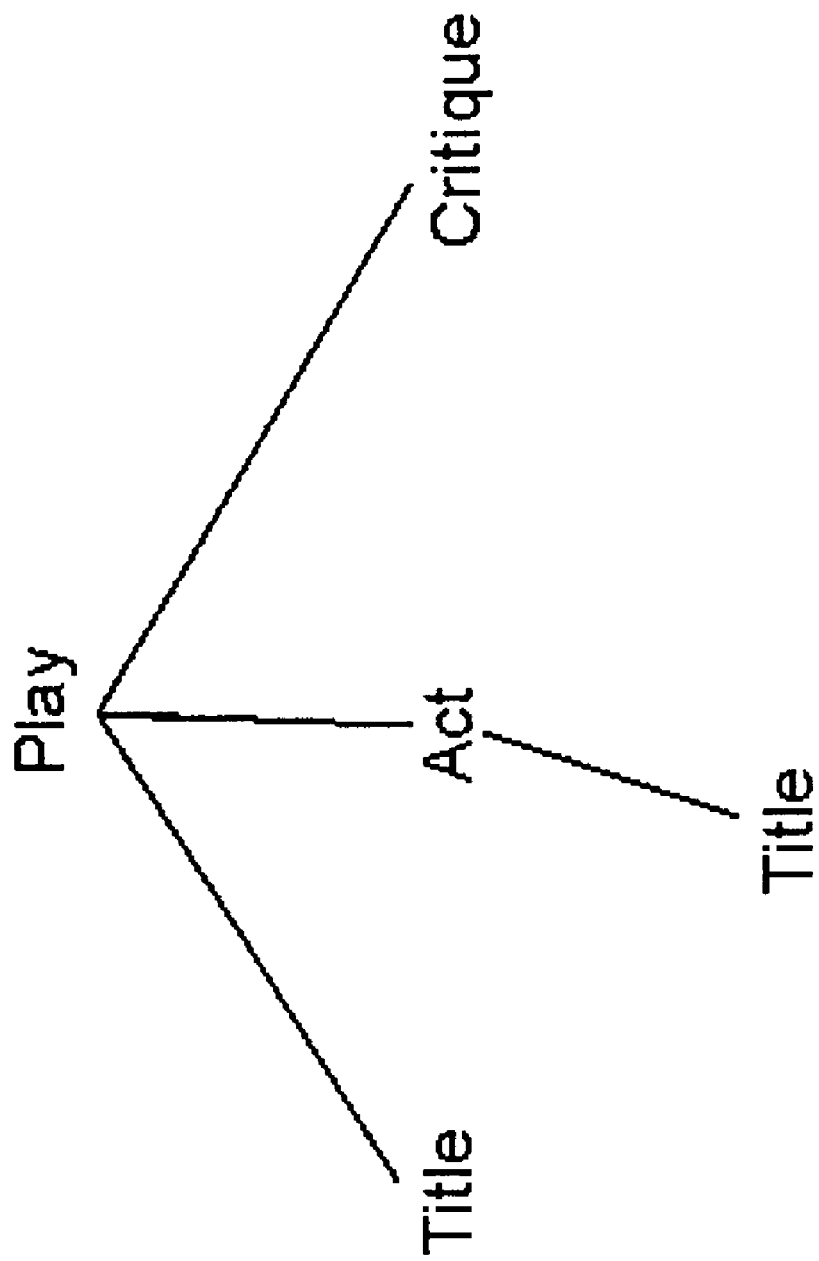
FIG. 2 is an ideal schema of the data base of FIG. 1.

In the embodiment the data base comprises an "ideal" schema, which is predetermined by a data base provider. The ideal schema is illustrated in FIG. 2. The nodes of the schema are arranged in a hierarchy. According to the designed application purpose of the data base, the schema comprises a first node, the root node "Play" and further three nodes "Title", "Act" and "Critique" depending directly on the root node. A further node "Title" depends on the node "Act". No further node depends on the nodes "Title" and "Critique". A data element of a document which is correspondingly assigned to these nodes is provided as type "#PCDATA" (parsed character data) and provided for reception of text. A schema path leads from the root nodes of the schema to every node. For example in the case of the latter node the path is called "/Play/Act/Title". Top down the schema is provided as a tree.

The XML-data in the instance of the documents is structured hierarchically. The structure of the instance of the first document, # 27, is illustrated in FIG. 3. The structure of the instance of the second document, # 28, is illustrated in FIG. 4. Subsequently, the structure of the instance of the document is briefly referred to as "structure of document". The structure of every document comprises a top data element, to which further data elements are linked dependently. To some of the further data elements again further data elements are linked, so that similar to the schema of the data base a top down arborescent structure is obtained. In the case of the first document, # 27, the elements "Act" and "Critique" for example are dependently subordinate to the root element "Play".

According to the exemplary embodiment the paths are referenced as follows:

| /Play | #0 |
| /Play/Title | #1 |
| /Play/Act | #2 |
| /Play/Critique | #3 |
| /Play/Act/Title | #4 |
| /Play/Author | #5 |

In FIG. 5a a repository of the exemplary embodiment is illustrated. The repository is formed schema oriented. It comprises a first list (path reference) with schema path references (node references) and a second list (document reference) with document references. For every schema path it is stated line by line, which document in the document set comprises a data element whose position in the structure of the respective document corresponds to the position of the node in the schema of the data base. For example the documents # 27 and # 28 comprise a data element at a position within the respective document structure which corresponds to the position of node # 2 in the schema of the data base (schema path: "/Play/Act", see the above table). In contrast e. g. only the first document # 27 comprises a data element at a position within the structure of this document which corresponds to node # 3 in the schema of the data base (schema path: "/Play/Critique").

In FIG. 5b a selectivity index of the embodiment is illustrated. The selectivity index comprises a first list (path reference) with schema path references (node references) for all schema paths, which are at least assigned to one of the documents in the repository. A second list (selectivity) serves for reception of selectivity values for the schema paths. The selectivity value of each reference path specifies the ratio of the number of documents—comprising a data element whose position in the structure of the document is described by the reference paths—to the number of documents stored in the data base (here: two). The selectivity information enables a particularly efficient search, provided that the search includes several steps. The selectivity information enables an estimate of the quantity of the data searched through with each step. The search is optimized, by searching through the smallest quantity with the first step i.e. the data element with the largest selectivity is searched through. The same applies for subsequent search steps.

In FIG. 6 the structure index of the data base according to the embodiment is illustrated. The structure index is document related. It comprises a first list (document reference) in which document references are listed. A second list (missing path reference), the missing path list, comprises references to those paths, which in the schema of the data base lead to a node, to which there is no corresponding data element in the respective document. A third list (additional path reference), the supplementary path list, comprises references to those supplementary paths, to which a data element in the respective document is assigned, to which however no respective node in the schema of the data base is assigned. Neither the missing path list nor the supplementary path list are limited to reception of only one element per document reference. If for example document # 28 would comprise a second supplementary path reference designated # 6, two path references, namely # 5 and # 6 would have to be entered in the supplementary path list.

For example the ideal schema comprises the path # 3 ("/Play/Critique", see above table). The second document, # 28, does not comprise any data element that is positioned in the structure of the second document such that it would be accessible by using the paths "/Play/Critique" (compare FIG. 4, in which this in fact non existent path is shown in broken lines). In comparison to the schema of the data base this path so to speak "misses" in the structure of the second document (compare FIG. 2). Thus, the reference of the second document, # 28, is entered in the document reference list of the structure index. In the missing path list of the structure index (missing path reference) an entry of the path reference of the "missing" path, namely # 3, is assigned to this reference.

In the embodiment the second document comprises a data element, which is positioned in the structure of the second document such that it is accessible by the path "/Play/Author" (compare FIG. 4), which is referenced by # 5 (compare table above). In comparison to the schema of the data base which does not comprise any node accessible via this path, this path exists in the structure of the second document so to speak "additionally"/"supplementary". Thus, an entry of the path reference of the supplementary path in the supplementary path list of the structure index (additional path reference), namely # 5 is assigned to the reference of the second document, # 28, in the document reference list.

The data base is stored on a hard disk of a computer system not shown. The computer system comprises a central operation unit (CPU) which is connected to the hard disk such that data on the hard disk can be processed in the central processing unit. The computer system further comprises an input interface for the import of documents and an input keyboard for keying in data and/or commands for the computer system as well as a monitor for displaying data.

If the user inputs a document in the computer system for example by means of the input keyboard, and stores said document in the data base, the method for the administration of the data base according to the invention is applied.

If the user gives a command to the central processing unit for example by means of the input keyboard, according to which a document, which is stored in the data base, has to be deleted from the data base, the inventive method is applied such that the document reference in the document reference list of the structure index of the data base and, if necessary, the path references assigned to the document reference will be deleted both from the missing path list and from the supplementary path list. Thus, a referential integrity of the data base is provided.

The user gives a command to the central processing unit of the computer system for example by means of the input keyboard, according to said command a search program searches the data base for a certain term, a character string, a bit pattern or the like. The user specifies at least one data element respectively one path which leads to the data element, and therefore specifies an area, in which the searched data shall be found. In another exemplary embodiment which will not be further explained below, the "user" is provided as a program, which runs on a second computer system and generates a search process of the data base, that is provided to the first computer system through the interface and searches the data base.

The search program searches the missing path list of the structure index (missing path reference) and determines by means of the path references entered, while assigned to the document references, which stored documents do not comprise the data element specified by the user. Those paths entered into the missing path list comprise such data elements whose position in the structure of the assigned document would correspond or be subordinate to a node in the schema of the data base. Because the reference path misses in the assigned document, also the registered data elements are not available in the assigned document, so that a search as regards contents for the data renders unnecessary and a search result is quickly obtained.

The search program further searches the supplementary path list of the structure index. If the area of a document to be searched includes positions outside the schema of the data base, this data can be accessed with particularly high speed by means of the entering in the supplementary path list. In this case the search program searches through a superordinate data element of the schema. Due to the path references which are specified in the supplementary path list, a structural search within this superordinate data element is possible, so that a time consuming search as regards contents can be limited to the narrower area of the data element specified by the user, if a path in the supplementary path list leads to the specified data element and a result of the search is quickly obtained.

The aforementioned methods for accessing data in a data base within a particularly short access time which have been explained by means of the embodiment of the inventive data base are based on an administration of the data base pursuant to the methods according to the invention, according to which in particular the structure index is set up and continuously updated, so that a referential integrity of the data base is provided. Therefore, the inventive methods, in particular when combined, enable a particularly rapid access to data of those documents, which are stored in the data base, as a structural search is particularly widely applicable, although the structure of the documents may differ from the schema of the data base.

The invention claimed is:

1. A computer readable medium comprising program instructions executable to implement a data base, comprising a document set for reception of at least one referenceable, structured document, which comprises at least one data element, the position of which in the document structure is determined by a referenceable structure path, further comprising a schema, which comprises a first node, to which further nodes are dependently linkable, so that, from the first node, to each further node of the schema respectively leads a referenceable schema path, and comprising a repository into which the schema path and, assigned to said schema path, at least one document reference is mapped, characterized by a structure index, into which the document reference and, assigned to said document reference, at least one structure path reference is mapped as missing path reference.

2. A computer readable medium according to claim 1, characterized by a selectivity index in which, for each node of the schema, ratio of value of an assigned node counter to value of a document counter can be entered.

3. A computer readable medium comprising program instructions executable to implement a data base, comprising a document set for reception of at least one referenceable, structured document, which comprises at least one data element, the position of which in the document structure is determined by a referenceable structure path, further with a schema which comprises a first node, to which further nodes are dependently linkable, so that, from the first node, to each further node of the schema respectively leads a referenceable schema path, and comprising a repository into which the schema path and, assigned to said schema path, at least one document reference is mapped, characterized by a structure index into which the document reference and, assigned to said document reference, at least one structure path reference is mapped as supplementary path reference and at least one structure path reference is mapped as missing path reference.

4. A computer readable medium comprising
program instructions executable by a computer, wherein the program instructions are executable to implement:
a data base, comprising a document set for reception of at least one referenceable, structured document, which comprises at least one data element; the position of which in the document structure is determined by a referenceable structure path, further comprising a schema, which comprises a first node, to which further nodes are dependently linkable, so that, from the first node, to each further node of the schema respectively leads a referenceable schema path, and
comprising a repository into which the schema path and, assigned to said schema path, at least one document reference is mapped, characterized by a structure index, into which the document reference and, assigned to said document reference, at least one structure path reference is mapped as missing path reference.

5. A computer readable medium according to claim 4, characterized by a selectivity index in which, for each node of the schema, ratio of value of an assigned node counter to value of a document counter can be entered.

6. A computer readable medium comprising
program instructions executable by a computer, wherein the program instructions are executable to implement:
a data base, comprising a document set for reception of at least one referenceable, structured document, which comprises at least one data element, the position of which in the document structure is determined by a referenceable structure path, further with a schema which comprises a first node, to which further nodes are dependently linkable, so that, from the first node, to each further node of the schema respectively leads a referenceable schema path, and
comprising a repository into which the schema path and, assigned to said schema path, at least one document reference is mapped, characterized by a structure index into which the document reference and, assigned to said document reference, at least one structure path reference is mapped as supplementary path reference and at least one structure path reference is mapped as missing path reference.

7. Computer system comprising
at least one central processing unit (CPU),
at least one storage unit with a storage means for storing data and/or commands for the central processing unit, being connected to the central processing unit; at least one input means for inputting data and/or commands in the central processing unit and/or for inputting data in the storage unit, at least one output means, for outputting data of the central processing unit and/or the storage unit, characterized in that the storage means comprises a data base, comprising a document set for reception of at least one referenceable, structured document, which comprises at least one data element, the position of which in the document structure is determined by a referenceable structure path, further with a schema which comprises a first node, to which further nodes are dependently linkable, so that, from the first node, to each further node of the schema respectively leads a referenceable schema path, and
comprising a repository into which the schema path and, assigned to said schema path, at least one document reference is mapped, characterized by a structure index into which the document reference and, assigned to said document reference, at least one structure path reference is mapped as supplementary path reference and at least one structure path reference is mapped as missing path reference.

8. Method for administrating a data base comprising a document set for reception of at least one referenceable, structured document, which comprises at least one data element, the position of which in the document structure is determined by a referenceable structure path, further
comprising a schema which comprises a first node to which further nodes are dependently linkable so that, from the first node, to each further node of the schema respectively leads a referenceable schema path and
comprising a repository into which the schema path and, assigned to said schema path, at least one document reference is mappable,
wherein the data base is characterized by a structure index into which the document reference and, assigned to said document reference, at least one structure path reference is mappable;
wherein the method comprises the steps:
searching the repository, for checking if the structure path reference of the document corresponds to a schema path reference of the schema,
and—if so
mapping the document reference in the repository of the data base while assigning the document reference to the schema path reference;
and—if not
characterized by the steps:
mapping the document reference into the structure index of the data base, in case the document reference is not yet mapped into the structure index;
mapping the structure path reference as a supplementary path reference which is assigned to the document reference, into the structure index of the data base, in case the supplementary path reference is not yet mapped, while assigned to the document reference, into the structure index;
and wherein the method is further characterized in that the structure index is provided like a list and comprises a document list for reception of the document reference of the document stored in the data base, and in that the structure index comprises a missing path list for reception of the schema path references as missing path references, which are assigned to the mapped documents.

9. Method according to claim 8,
characterized by the steps:
checking if in the structure index of the data base for a document, which is deleted from the data base, an entry of the document reference exists, and—if so
checking if at least an entry of a missing path reference exists, which corresponds to the document reference, and—if so
deleting the at least one identified missing path reference from the structure index of the data base;
as well as further
checking if at least one entry of a supplementary path reference exists, which is assigned to the document reference and—if so
deleting the at least one identified supplementary path reference from the structure index of the data base;
as well as further
deleting the document reference from the structure index of the data base.

10. Method according to claim 8,
characterized in that the structure index comprises a supplementary path list for reception of the structure path references as supplementary path references, which are assigned to the mapped documents.

11. Method according to claim 8,
characterized in that
the structured document is formatted in a markup language, and in that each position in the structure respectively each data element is marked by a tag of the markup language.

12. Method according to claim 11,
characterized in that
the markup language is provided as XML.

13. Method for administrating a data base comprising a document set for reception of at least one referenceable, structured document, which comprises at least one data element, the position of which in the document structure is determined by a referenceable structure path, further
comprising a schema which comprises a first node to which further nodes are dependently linkable so that, from the first node, to each further node of the schema respectively leads a referenceable schema path and
comprising a repository into which the schema path and, assigned to said schema path, at least one document reference is mappable,
wherein the data base is characterized by a structure index into which the document reference and, assigned to said document reference, at least one structure path reference is mappable;
wherein the method comprises the steps:
searching the repository, to check if the structure path reference of the document corresponds to a schema path reference of the schema,
and—if so
mapping the document reference into the repository of the data base while assigning the document reference to the schema path reference,
characterized by the steps:
searching the document, to check if the schema path reference corresponds to a structure path reference being assigned to the document;
and—if not mapping the document reference in the structure index of the data base, in case the document reference is not yet mapped into the structure index;
as well as
mapping the schema path reference as a missing path reference, which is assigned to the document reference, into the structure index of the data base, in case the missing path reference is not yet mapped, while assigned to the document reference, into the structure index;
and wherein the method is further characterized in that the structure index is provided like a list and comprises a document list for reception of the document reference of the document stored in the data base, and in that the structure index comprises a missing path list for reception of the schema path references as missing path references, which are assigned to the mapped documents.

14. Method according to claim 13,
characterized by the steps:
checking if in the structure index of the data base for a document, which is deleted from the data base, an entry of the document reference exists, and—if so
checking if at least an entry of a missing path reference exists, which corresponds to the document reference, and—if so
deleting the at least one identified missing path reference from the structure index of the data base;
as well as further
checking if at least one entry of a supplementary path reference exists, which is assigned to the document reference and—if so
deleting the at least one identified supplementary path reference from the structure index of the data base;
as well as further
deleting the document reference from the structure index of the data base.

15. Method according to claim 13,
characterized in that the structure index comprises a supplementary path list for reception of the structure path references as supplementary path references, which are assigned to the mapped documents.

16. Method according to claim 13,
characterized in that
the structured document is formatted in a markup language, and in that each position in the structure respectively each data element is marked by a tag of the markup language.

17. Method according to claim 16,
characterized in that
the markup language is provided as XML.

18. Method for administrating a data base comprising a document set for reception of least one referenceable, structured document, which comprises at least one data element, the position of which in the document structure is determined by a referenceable structure path, further
comprising a schema which comprises a first node to which further nodes are dependently linkable so that, from the first node, to each further node of the schema respectively leads a referenceable schema path and
comprising a repository into which the schema path and, assigned to said schema path, at least one document reference is mappable,
wherein the data base is characterized by a structure index into which the document reference and, assigned to said document reference, at least one structure path reference is mappable;
wherein the method comprises the steps:
searching the repository, for checking if the structure path reference of the document corresponds to a schema path reference of the schema,
and—if so
mapping the document reference in the repository of the data base while assigning the document reference to the schema path reference;
characterized by the steps:
searching the document, to check if the schema path reference corresponds to a structure path reference being assigned to the document;
and—if not
characterized by the steps:
mapping the document reference into the structure index of the data base, in case the document reference is not yet mapped into the structure index;
mapping the structure path reference as a supplementary path reference which is assigned to the document reference, into the structure index of the data base, in case the supplementary path reference is not yet mapped, while assigned to the document reference, into the structure index;
mapping the schema path reference as a missing path reference, which is assigned to the document reference, into the structure index of the data base, in case the missing path reference is not yet mapped, while assigned to the document reference, into the structure index;
and wherein the method is further characterized in that the structure index is provided like a list and comprises a document list for reception of the document reference of the document stored in the data base, and in that the structure index comprises a missing path list for reception of the schema path references as missing path references, which are assigned to the mapped documents.

19. Method according to claim 18,
characterized by the steps:
checking if in the structure index of the data base for a document, which is deleted from the data base, an entry of the document reference exists, and—if so
checking if at least an entry of a missing path reference exists, which corresponds to the document reference, and—if so
deleting the at least one identified missing path reference from the structure index of the data base;
as well as further
checking if at least one entry of a supplementary path reference exists, which is assigned to the document reference and—if so
deleting the at least one identified supplementary path reference from the structure index of the data base;
as well as further
deleting the document reference from the structure index of the data base.

20. Method according to claim 18,
characterized in that the structure index comprises a supplementary path list for reception of the structure path references as supplementary path references, which are assigned to the mapped documents.

21. Method according to claim 18,
characterized in that
the structured document is formatted in a markup language, and in that
each position in the structure respectively each data element is marked by a tag of the markup language.

22. Method according to claim 21,
characterized in that
the markup language is provided as XML.

23. Computer system comprising
at least one central procession unit (CPU)
at least one storage unit with a storage means for storing data and/or commands for the processing unit, being connected to the central processing unit,
at least one input means, for inputting data and/or commands in the central processing unit and/or for inputting data in the storage unit,
at least one output means, for outputting data of the central processing unit and/or the storage unit,
characterized in that the central processing unit is provided for carrying out a method for administrating a data base comprising a document set for reception of least one referenceable, structured document, which comprises at least one data element, the position of which in the document structure is determined by a referenceable structure path, further
comprising a schema which comprises a first node to which further nodes are dependently linkable so that, from the first node, to each further node of the schema respectively leads a referenceable schema path and
comprising a repository into which the schema path and, assigned to said schema path, at least one document reference is mappable,
wherein the data base is characterized by a structure index into which the document reference and, assigned to said document reference, at least one structure path reference is mappable;
wherein the method comprises the steps:
searching the repository, for checking if the structure path reference of the document corresponds to a schema path reference of the schema,
and—if so
mapping the document reference in the repository of the data base while assigning the document reference to the schema path reference;
and—if not
characterized by the steps:
mapping the document reference into the structure index of the data base, in case the document reference is not yet mapped into the structure index;
mapping the structure path reference as a supplementary path reference which is assigned to the document reference, into the structure index of the data base, in case the supplementary path reference is not yet mapped, while assigned to the document reference, into the structure index;
and wherein the computer system is further characterized in that the structure index is provided like a list and comprises a document list for reception of the document reference of the document stored in the data base, and the structure index comprises a missing path list for reception of the schema path references as missing path references, which are assigned to the mapped documents.

24. Computer system according to claim 23,
characterized by the steps:
checking if in the structure index of the data base for a document, which is deleted from the data base, an entry of the document reference exists, and—if so
checking if at least an entry of a missing path reference exists, which corresponds to the document reference, and—if so
deleting the at least one identified missing path reference from the structure index of the data base;
as well as further
checking if at least one entry of a supplementary path reference exists, which is assigned to the document reference and—if so
deleting the at least one identified supplementary path reference from the structure index of the data base;
as well as further
deleting the document reference from the structure index of the data base.

25. Computer system according to claim 23,
characterized in that the structure index comprises a supplementary path list for reception of the structure path references as supplementary path references, which are assigned to the mapped documents.

26. Computer system according to claim 23,
characterized in that
the structured document is formatted in a markup language, and in that
each position in the structure respectively each data element is marked by a tag of the markup language.

27. Computer system according to claim 26,
characterized in that
the markup language is provided as XML.

28. Computer system comprising
at least one central processing unit (CPU),
at least one storage unit with a storage means for storing data and/or commands for the central processing unit, being connected to the central processing unit;
at least one input means for inputting data and/or commands in the central processing unit and/or for inputting data in the storage unit, at least one output means, for outputting data of the central processing unit and/or the storage unit, characterized in that the storage means comprises a data base, comprising a document set for reception of at least one referenceable, structured document, which comprises at least one data element, the position of which in the document structure is determined by a referenceable structure path, further comprising a schema, which comprises a first node, to which further nodes are dependently linkable, so that, from the first node, to each further node of the schema respectively leads a referenceable schema path, and
comprising a repository into which the schema path and, assigned to said schema path, at least one document reference is mapped, characterized by a structure index, into which the document reference and, assigned to said document reference, at least one structure path reference is mapped as missing path reference.

29. Computer system according to claim 28, characterized by a selectivity index in which, for each node of the schema, ratio of value of an assigned node counter to the value of the a document counter can be entered.

30. Computer system comprising
at least one central processing unit (CPU),
at least one storage unit with a storage means for storing data and/or commands for the central processing unit, being connected to the central processing unit;
at least one input means for inputting data and/or commands in the central processing unit and/or for inputting data in the storage unit,
at least one output means, for outputting data of the central processing unit and/or the storage unit,
characterized in that the storage means comprises a data base,
comprising a document set for reception of at least one referenceable, structured document, which comprises at least one data element, the position of which in the document structure is determined by a referenceable structure path, further comprising a schema, which comprises a first node, to which further nodes are dependently linkable, so that, from the first node, to each further node of the schema respectively leads a referenceable schema path, and comprising a repository into which the schema path and, assigned to said schema path, at least one document reference is mappable, characterized by a structure index, into which the document reference and, assigned to said document reference, at least one structure path reference is mappable as missing path reference;

characterized in that the central processing unit is provided for carrying out a method for administrating a data base comprising a document set for reception of least one referenceable, structured document, which comprises at least one data element, the position of which in the document structure is determined by a referenceable structure path, further comprising a schema which comprises a first node to which further nodes are dependently linkable so that, from the first node, to each further node of the schema respectively leads a referenceable schema path and comprising a repository into which the schema path and, assigned to said schema path, at least one document reference is mappable, wherein the data base is characterized by a structure index into which the document reference and, assigned to said document reference, at least one structure path reference is mappable;

wherein the method comprises the steps:

searching the repository, for checking if the structure path reference of the document corresponds to a schema path reference of the schema, and—if so mapping the document reference in the repository of the data base while assigning the document reference to the schema path reference;

and—if not characterized by the steps:

mapping the document reference into the structure index of the data base, in case the document reference is not yet mapped into the structure index;

mapping the structure path reference as a supplementary path reference which is assigned to the document reference, into the structure index of the data base, in case the supplementary path reference is not yet mapped, while assigned to the document reference, into the structure index.

* * * * *